Sept. 7, 1954  R. L. MERRILL ET AL  2,688,459
AVERAGING SYSTEM
Filed March 29, 1951  3 Sheets-Sheet 1
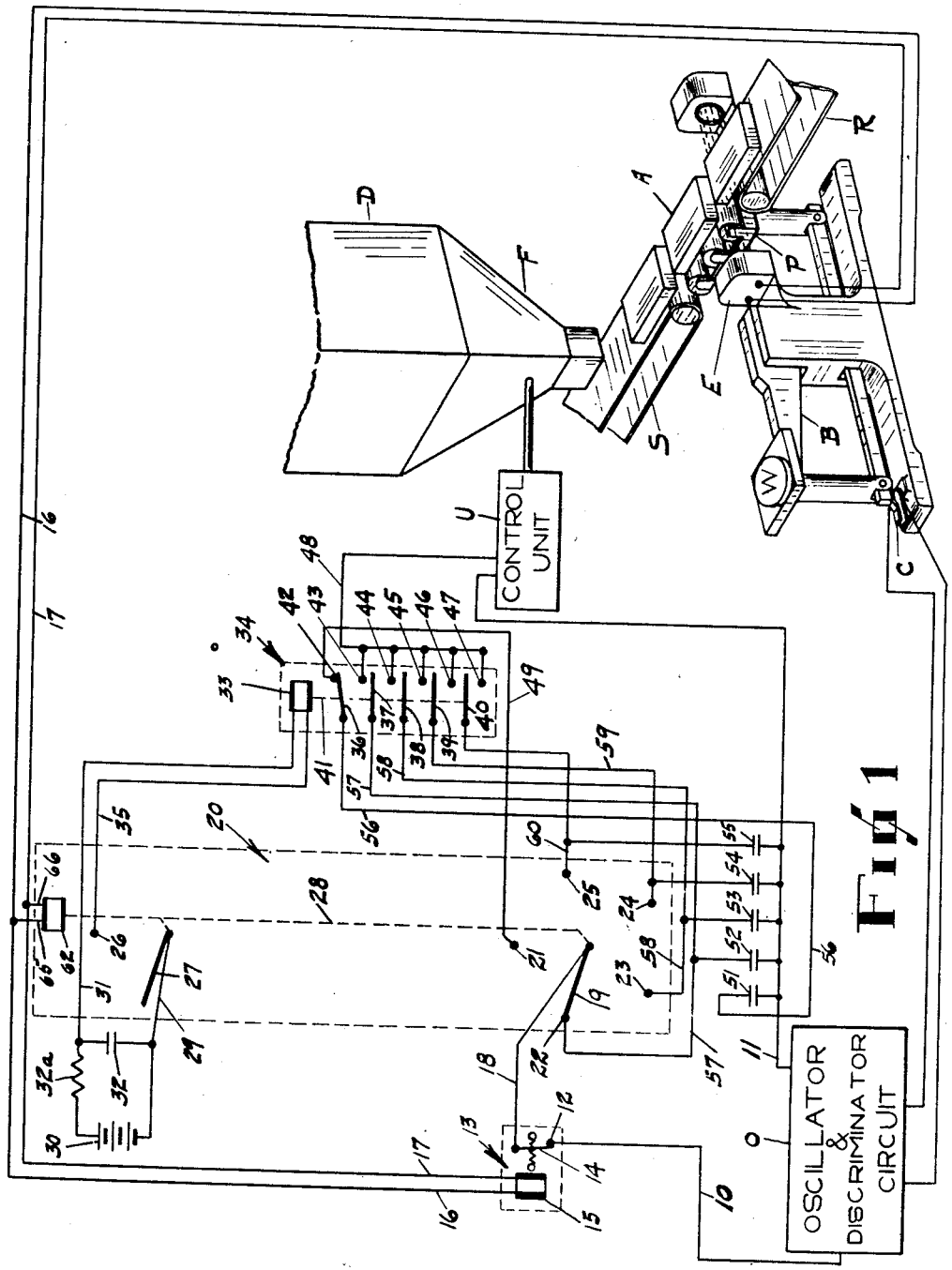
INVENTORS.
ROGER L. MERRILL
WILLIAM HECOX
By Corbett, Mahoney + Miller
ATTYS.

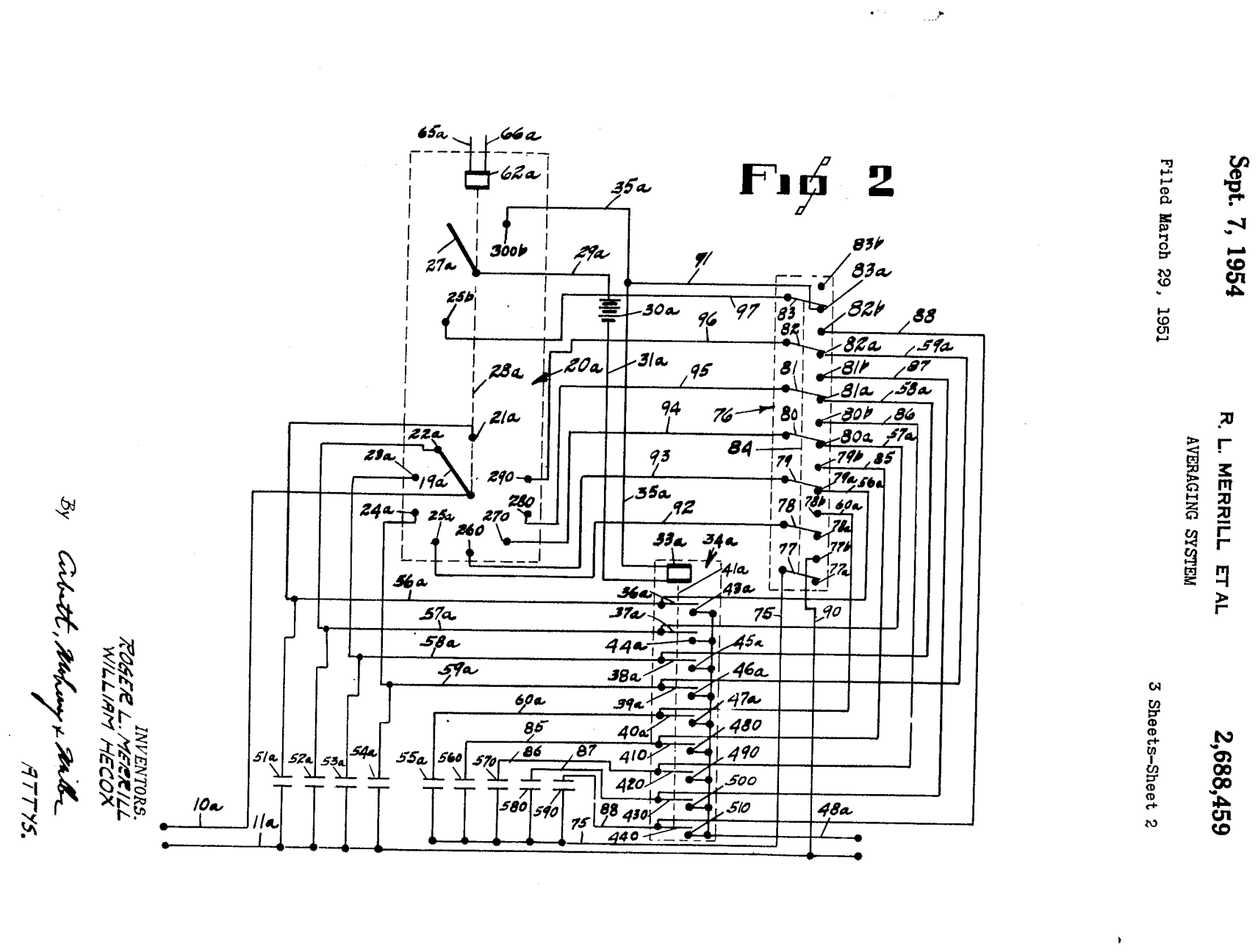

Sept. 7, 1954        R. L. MERRILL ET AL        2,688,459
                      AVERAGING SYSTEM
Filed March 29, 1951                          3 Sheets-Sheet 3
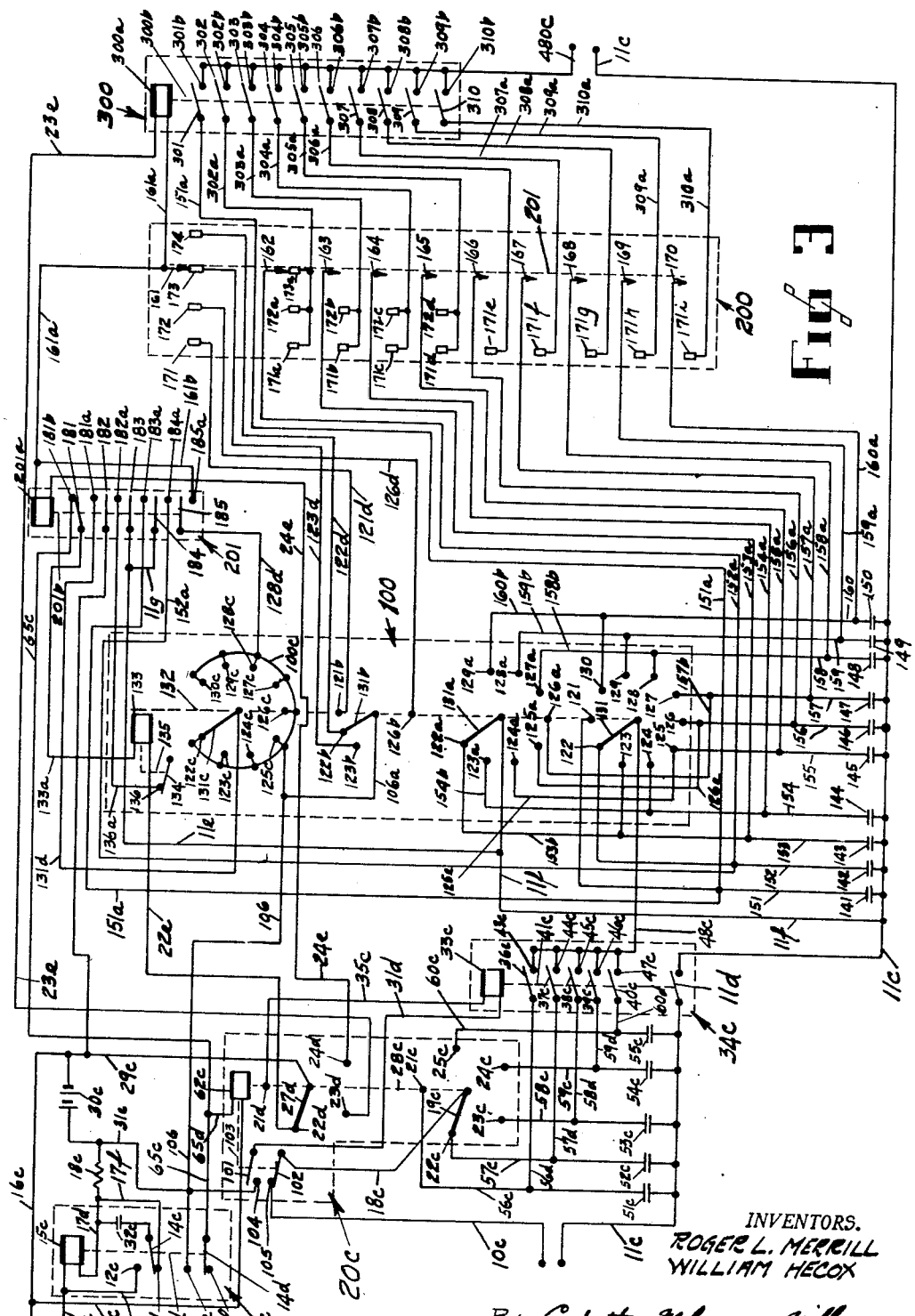
INVENTORS.
ROGER L. MERRILL
WILLIAM HECOX
By Corbett, Mahoney & Miller
ATTYS.

Patented Sept. 7, 1954

2,688,459

UNITED STATES PATENT OFFICE 2,688,459

AVERAGING SYSTEM

Roger L. Merrill and William Hecox, Columbus, Ohio, assignors, by mesne assignments, to The Exact Weight Scale Company, Columbus, Ohio, a corporation of Ohio Application March 29, 1951, Serial No. 218,123

28 Claims. (Cl. 249—2)

Our invention relates to an averaging system. It has to do, more particularly, with a system which determines the average value of a particular variable characteristic in a group or series of objects or articles being checked in regard to such characteristic. Our system will indicate such average value and may translate it into energy which can be used as a control factor in obtaining the desired characteristic in following objects or articles being checked.

The application of statistical method to control of a variable characteristic in a plurality of products, while having distinct advantages, is difficult to achieve on many high-speed production lines. The reason for such difficulty in application is due to the inability of devices of the prior art to translate desired knowledge at a speed commensurate with the rate of production of the particular product under consideration.

For purposes of simplification, and ease of presentation, the application of our invention will be described only in connection with the averaging of the variable which is weight. However, it is to be understood that other variables, such as linear measurements, electromotive force, color, etc. may be effectively dealt with by means of the device and method hereinafter described.

In the packaged food industry where single factories produce as much as one million or more packaged items daily, the net weight of each of such packages must be closely controlled within certain positive and negative limits, or tolerances, as measured from a selected weight because of weight ordinances and economic reasons.

Obviously, it is economically impractical to have a package contain the exact desired weight of product therein. The actual weight of the product contained in a package is usually made slightly more than the exact net weight indicated thereon. Additional quantity of product in a package above the indicated value on the package of the net weight represents a quantity of product which the manufacturer is literally "giving away" to the consumer. While this quantity in each individual package is sometimes slight, in comparison to the total weight of that package, when it is remembered that sometimes more than one million packages containing such an excess of product are produced daily, there is represented a total quantity of product corresponding to a considerable amount of money.

It is the practice, in almost every such packaging operation, to measure the quantity of product placed in a package by means of a dispenser which dispenses a certain volume of product. A knowledge of the density of the product, the particular head of product in the dispensing apparatus, and other factors, enables approximately the desired weight of product to be obtained in each package. Unfortunately, various external and unknown factors influence the volume of product dispensed, so that the particular dispenser has to be frequently adjusted in order to obtain a product having a net weight within certain desired positive and negative values above and below a selected desired weight.

Depending, of course, upon the material being handled and various other factors, the particular product being dispensed may be dispensed from a single dispenser at rates as high as 90 packages per minute. Obviously, the cost involved in manually check-weighing and averaging the weights of such packages would be prohibitive.

There exists, and is on the market at the present time, a device called the "Selectrol," which is manufactured by the Exact Weight Scale Company of Columbus, Ohio. This device is disclosed in detail in the U. S. patent of Flannagan et al., No. 2,232,023 of June 29, 1943. As shown in such patent, the "Selectrol" actually comprises a continuous conveyor type of weighing device which weighs a package as it moves along a conveyor. It has, associated with it, controls which shunt packages which are overweight, beyond a certain desired limit, and underweight, beyond a certain desired limit, onto separate slides or conveyors to be carried to points where such overweight and underweight conditions in those packages may be corrected. Packages which are within the prescribed weight tolerances are permitted to be carried on the necessary conveying system to further operations such as wrapping or boxing, etc. The "Selectrol" does not indicate the total weight of the package which passes thereover, but indicates the quantity that such package is overweight or underweight as compared to a desired weight.

It should be apparent to those skilled in the art of statistical methods of quality control that information obtained from a weight checking machine such as the "Selectrol" could be utilized to constantly recalibrate or adjust the dispenser which is continuously filling packages with commodities or products which are check-weighed on such a "Selectrol."

There do not exist in the prior art devices which could be used to effect such a desired result.

It is the main object of our invention to provide a statistical system in conjunction with a measuring or checking device for determining the average value of a particular variable characteristic in a group or series of articles or objects being checked by the measuring or checking device in regard to such characteristic.

It is another object of our invention to provide a system of the type indicated above which not only determines the average value but which also translates such value into energy which can be measured and indicated so that such information can be used in controlling a dispensing device.

A further object of our invention is to provide a system of the type indicated wherein the average value determination is translated in the system into a voltage output which can be used as the input signal for automatic control of the dispensing device.

There is obtainable from the "Slectrol" a value of voltage which is proportionate to the weight of the quantity of product above or below a selected desired weight for each package which passes through the "Selectrol." If the packages are exactly of the desired weight, no voltage output will result from the "Selectrol." For each package which is check-weighed on the "Selectrol," this voltage will be negative if the total weight of the package is above the desired weight, and will be positive, if the total weight of the package is below the desired weight. As each package leaves the weighing portion of the conveyor, it creates an actuating impulse by interrupting a light beam in a photoelectric cell circuit. These two factors, the difference in weight of a particular packaged product from a desired weight, as represented by a particular voltage value, which may be either positive or negative, and an impulse from the interruption of a photoelectric cell circuit, are utilized as control factors by the device in which our system is embodied.

While the device disclosed herein is particularly adapted for use with the "Selectrol," it is not limited thereto, but may be used with various other checking or measuring devices which will supply a positive or negative voltage value, corresponding to either the difference in the desired variable from a selected value or the total value of such a variable. In the latter case, obviously, the voltage values would all be positive. Moreover, while it is indicated above that a photoelectric cell circuit is utilized to supply a control impulse to the device in which our invention is embodied, it should be readily apparent that mechanical devices or other devices may be used to supply such an impulse.

For statistical quality control purposes the average value of a particular variable of each of successive, comparatively small groups of products is desirable.

If a standard deviation for a particular universe is obtained, the universe comprising a large number of packages filled by a suitable dispenser on a production line, such standard deviation may be assumed to be the same for successive populations on the same production line and with the same dispenser assuming that there are no assignable causes for variation. Certain multiples of such standard deviation may be taken as limits, the value of such limits depending upon the type of variation anticipated. Therefore, a comparison of an average value of differences in weight from a selected desired weight for each of comparatively small successive groups of packages with such limits will furnish information which may be used by an operator or by automatic means, to effect a correction of the particular dispenser involved. The net result is to maintain the partciular desired variable, in this case weight, as near as possible to a selected value for each package produced.

The device hereinafter described and illustrated in the accompanying drawings may be used to obtain such average values of differences in weight from a selected value for each of successive groups of packages.

In these drawings:

Figure 1 is a schematic view including a wiring diagram of an averaging device according to our invention.

Figure 2 is a similar view showing a modification of the circuit.

Figure 3 is a wiring diagram of a cumulative averaging device designed to obtain an average value from a larger number of units.

With reference to the drawings, in Figure 1 we have illustrated a device which will obtain the average variation, if any, from the desired weight of five successive packages which are being check-weighed for the desired weight. However, it is to be understood that the circuit can be varied in an obvious manner to average more than five or less than five packages.

In Figure 1, we have illustrated diagrammatically basic elements of a weight-checking machine of the "Selectrol" type. It comprises a weighing beam B of the over-and-under weight type which has a counterweight or weight platform W at one end and the commodity portion P at the other end that is a part of a conveyor line. The packages A to be check-weighed are supplied by a conveyor section S of the conveyor line which carries the filled packages away from the dispenser D. The filler spout F of dispenser D can be controlled in a suitable manner to vary the volume of material or commodity supplied to each package. Another conveyor section R of the continuous line removes the check-weighed packages A from the conveyor section P. Associated with the counterweight end of the beam B is a condenser C which forms a part of an oscillator and discriminator circuit O of the type disclosed in Patent No. 2,323,023. Movement of the plates of condenser C, caused by movement of beam B, results in a variation in the oscillating frequency of circuit O and results in an output voltage. An amplifying circuit may be provided between circuit O and our averaging device if desired. The packages A move continuously and successively across the conveyor section P and the beam B will move to a position of equilibrium corresponding to the weight of that package. The conveyor section P may have an electric eye or photoelectric relay system E associated therewith so that as each article A passes from the conveyor section P, the light beam thereof is broken.

The circuit shown in Figure 1 comprises the lines 10 and 11 by means of which the voltage signals, from successive packages on the "Selectrol" or other associated measuring or checking machine, are introduced into our device. For example, lines 10 and 11 may be connected to circuit O of the "Selectrol" for receiving the voltage output thereof. These connections may be at the points 57a and 58a of the circuit disclosed in Patent No. 2,323,023. The nature of this voltage input will depend upon the particular package being check-weighed on the "Selectrol" and will be proportionate to the amount of variation, in weight, of the package from a desired weight and may be a positive or a negative value, it being understood that if the package is of desired weight, no voltage input will result. However, as previously indicated, this voltage input value could be proportionate to the total weight of each package being weighed and, in that case, would always be positive.

The line 10 is connected to the contact point 12 of a relay 13. This relay includes a movable contact arm 14, that cooperates with point 12 and which is controllable by means of the normally energized relay coil 15, it being noted that contact arm 14 normally contacts point 12. Springs or other means may be provided in association with arm 14 to delay slightly movement of it into and out of engagement with the point 12. Lines 16 and 17 are connected to the relay coil 15, and are adapted to receive an impulse which originates from the interruption of the light beam in the photoelectric cell circuit previously mentioned. The movable contact 14 of relay 13 is connected by a line 18 to a movable contact arm 19 of a stepping switch which is indicated generally by numeral 20. This stepping switch 20 is preferably of the two deck type now commonly in use. A suitable switch for our purpose is manufactured and sold by C. P. Clare & Company, Chicago 30, Illinois. The lower deck is provided with five contact points 21, 22, 23, 24 and 25 which are uniformly angularly spaced for cooperation with the contact arm 19 which is adapted to move in a counterclockwise direction. The upper deck of the stepping switch is provided with a single contact point which is designated 26 and is in the same relative position as contact point 21 of the lower deck. The upper deck of the stepping switch has the contact arm 27 for cooperating with the contact point 26. This arm 27 is connected to arm 19 for movement therewith by means of a suitable mechanical connection indicated generally by numeral 28.

The contact arm 27 is connected by a line 29 to a suitable D. C. source indicated as a battery 30. Another line 31 leads from this D. C. source and includes a resistance 32a. Connected across the lines 29 and 31 is a condenser 32. The line 31 is connected to the coil 33 of a relay indicated generally by the numeral 34. This coil is also connected to contact point 26 of the upper deck of the stepping switch 20 by means of a line 35.

The relay 34 includes the movable contact arms 36, 37, 38, 39 and 40 which are ganged together by means of a mechanical connection, indicated by dotted line 41, and movable by means of coil 33 to move all of such contact arms. Associated with the movable arm 36 is a pair of fixed contacts 42 and 43 between which the arm moves, it being noted that the arm normally contacts point 42 and is spaced from point 43. For cooperation with the other contact arms 37, 38, 39 and 40 of this relay, the contact points 44, 45, 46 and 47, respectively, are provided, it being noted that the arms are normally spaced from such points. The contact points 43, 44, 45, 46 and 47 are connected to a common line 48 which is an output voltage line. The contact point 42 is connected by line 49 to the contact point 21 of the lower deck of the stepping switch 20.

In the circuit, we provide five capacitors or condensers designated 51, 52, 53, 54 and 55, and being of equal value. One side of each of these condensers is connected to the input line 11, one end of which serves as one of the voltage input lines and the other end of which serves as one of the voltage output lines of our device. The opposite side of the first condenser 51 is connected by line 56 to the contact arm 36 of relay 34. The opposite side of the second condenser 52 is connected to line 57 which runs from contact point 22 of the stepping switch to the relay contact arm 37. The opposite side of the third condenser 53 is connected to line 58 which connects switch contact point 23 with relay arm 38. Similarly, the fourth and fifth condensers 54 and 55 are connected to the respective lines 59 and 60. Line 59 connects point 24 with arm 39 and line 60 connects point 25 with arm 40.

As previously indicated, the contact arms 19 and 27 of the stepping switch 20 are moved in a counterclockwise direction by means of the mechanical connection 28. In practice we prefer to use a double-deck switch where arms 19 and 27 would be on the same shaft. Each time a relay 62 is energized, the contact arms 19 and 27 will be moved in a counterclockwise direction one step. The relay 62 may receive its actuating impulse through the lines 65 and 66 connected thereto to lines 16 and 17.

If our device is used in connection with the "Selectrol" as indicated, the lines 65 and 66 as well as the lines 16 and 17 will be connected to the photoelectric cell circuit E thereof, as shown in Figure 1, so that each of the relay coils 15 and 62 will receive an actuating impulse from the interruption of the light beam of such circuit. However, instead of an electrical impulse for actuating the stepping switch 20 to advance the contact arms 19 and 27 thereof, a mechanical linkage (not shown) may be provided between the weighing portion of the "Selectrol" and the mechanical connection 28.

Our device will operate as follows:

As the package A moves across the weighing portion P of the "Selectrol," if it is over-weight or under-weight, there will be generated a voltage which will be retained in our device when such package interrupts the light beam of the photoelectric cell. At that instant, there will be left upon one of the condensers 51–55 a voltage corresponding to the weight that the particular package varies from the desired weight. The circuit which impresses this voltage on one of the condensers includes the lines 10 and 11 which provide the input voltage. Let us assume that contacts 19 and 27 of the stepping switch 20 are in the position shown in Figure 1 just prior to breaking of the photoelectric beam by the package, that is contact arm 19 is on point 22 and arm 27 is in a similar position. At the instant the photoelectric beam is broken, the relay 13 is actuated, by energizing coil 15. At the same time energization of coil 62 will cause contact arms 19 and 27 to be moved one step by moving the connection 28 in the right direction. At the same instant, the contact arm 14 of relay 13 will move into contact with point 12. Thus, at this instant, the circuit for the input voltage will be through line 10, arm 14, line 18, contact arm 19, which has now been engaged with point 23, line 58, condenser 53 and line 11, the line 58 leading on to contact arm 38 which is spaced from point 45 at this time. Thus, one of the condensers, that is, condenser 53, receives an input voltage which is proportionate to the strength of the input voltage created by variation in weight of a particular package from a desired weight, that package being the one which breaks the photoelectric light beam and supplies the actuating impulse to our device. In this same manner all of the condensers 51, 52, 53, 54 and 55 are successively connected in the circuit, causing charging of any of them which are connected in the circuit by the actuating impulse of a package not having the desired weight.

After all five condensers are successively connected in the circuit by means of the actuating impulses produced on relays 13 and 62 by five successive articles on the "Selectrol," and all of the condensers are thereby charged, then all the condensers are put in parallel in order to obtain an output voltage which is the arithmetic average of the voltage input to each condenser. If some of the voltages are positive and some are negative, this will automatically be taken into consideration merely by connecting the condensers in parallel. Such a parallel connection of the condensers prior to the connection of condenser 51 in the circuit in a repetition of the cycle is accomplished in the following manner:

As the movable contact arm 19 of stepping switch 20 moves from point 25 to point 21 and contact arm 27 moves therewith to point 26, the slight lag in the movement of contact arm 14 of relay 13 into contact with point 12 permits the circuit for condenser 51, to remain open for a short interval. During this interval, all the condensers which have been previously connected in the circuit, are put in parallel and the resulting voltage output from our device is either measured or utilized in some other manner. With the contact arm 19 in contact with the point 21 and with relay contact arm 14 spaced from point 12, none of the condensers can be charged at the instant. At this instant, arm 27 is in contact with point 26 and this will close the circuit to the coil 33 of relay 34 through lines 35 and 31. Relay 34, as previously indicated, is of the single-pulse operated type, the operating pulse being obtained from the D. C. source 30 by means of the condenser 32 and the resistance 32a. Relay 34 is so designed that it will operate at or above a particular voltage. When the voltage to relay coil 33 reaches that voltage, the mechanical connection 41 will be moved to move the arms 36–40 into contact with their respective points 43–47, arm 36 moving away from point 42. When the voltage to the relay coil 33 drops below that voltage, the coil will be deenergized and the contact arms 36–40 will again be moved away from their respective contact points 43–47 but arm 36 will again be moved into contact with point 42. By means of the condenser 32 and the resistance 32a there is impressed upon relay coil 33 an initial voltage higher than that necessary to actuate it and, consequently, relay 34 will be actuated and thereby connect all of the condensers 51–55 to the common lead 48. The lead 48 and line 11 will be connected to a high resistance load so that the voltage may be measured before the condensers are discharged. The voltage impressed upon relay coil 33 will decrease rapidly while switch contact arm 27 remains at point 26 to a value below that necessary to keep the coil 33 energized sufficiently and, consequently, the relay contact arms will be permitted to return to their original positions. Upon actuation of relay 34, the five condensers 51–55 are put in parallel and at the same time arm 14 of relay 13 is held spaced from point 12 which will prevent charging of the first condenser 51 prior to returning of contact arm 36 to point 42.

All of the above-described paralleling of condensers 51–55 occurs in such a short period of time during which it would be physically impossible for a package to pass through the "Selectrol" even though it might take less than two-thirds of a second for such passage.

The procedure outlined above is repeated continuously and averages of departure from the desired weight of each successive package of successive groups of five packages are obtained resulting in successive voltage outputs from our device through lines 48 and 11.

These voltage outputs may be used as desired, for example, they may be transmitted to a control unit U indicated diagrammatically in Figure 1. This unit U may register the amount of the voltage output in terms of weight correction so that the dispenser D can be correspondingly adjusted or it can actually control the dispenser. For example, this unit may be of the type disclosed in the co-pending application of Roger L. Merrill and William Hecox, Ser. No. 218,122, filed March 29, 1951.

It will be apparent that with the arrangement of Figure 1, each successive package creates an impulse which connects one of the condensers 51–55 in the circuit, the condensers being successively connected in the circuit by the packages of a group of five, the last package of such group serving to connect all the condensers in parallel. Thus each package passing through the "Selectrol" to be check-weighed is averaged. The averaging arrangement shown in Figure 2 is similar to that of Figure 1 with the exception that a package between successive groups is relied upon to connect in parallel all the condensers, which have been previously connected in the circuit. With this arrangement, all the packages of a group are averaged but the next succeeding package is not averaged but is relied upon to connect the group of condensers in parallel. Any desired number of packages may be averaged in each group, the arrangement shown in Figure 2 being selectively adjustable to average a group of five or a group of nine, these numbers being selected merely as examples. The circuit may be changed to average any number of groups of any selected numbers.

The circuit of Figure 2 comprises the input lines 10a and 11a from the "Selectrol" or similar checking device or machine. In this instance, a relay, equivalent to relay 13, is not used but the line 10a is connected directly to the movable contact arm 19a of a stepping switch 20a similar to switch 20 of Figure 1. The lower deck of this switch is provided with nine arm contact points 21a, 22a, 23a, 24a, 25a, 260, 270, 280 and 290 which are uniformly angularly spaced for cooperation with the contact arm 19a which is adapted to move in a counterclockwise direction. The upper deck of the stepping switch is provided with the two arm-contact points 25b, and 300b, point 25b corresponding in position to the point 25a, and point 300b being at the position which corresponds to the next step beyond the position of point 290. In other words, point 25b is in the fifth position and point 300b is in the tenth position of the stepping switch arm 27a. This arm 27a is connected to arm 19a for movement therewith by means of a mechanical connection indicated by numeral 28a. The arm 27a is connected by a line 29a to a suitable D. C. source 30a. Another line 31a leads from this source and is connected to the coil of relay 34a. The coil is also connected by line 35a to the contact point 300b of the upper deck of the stepping switch.

The relay 34a includes the nine movable contact arms 36a, 37a, 38a, 39a, 40a, 41a, 42a, 43a and 44a which are ganged together by mechanical connection 41a and are movable by means of the coil of relay 34a which actuates connection 41a. Fixed contacts 43a, 44a, 45a, 46a, 47a, 48a, 49a, 50a and 51a are associated with the respective movable contacts 36a, 37a, 38a, 39a, 40a, 41a, 42a, 43a and 44a. The fixed contacts are connected to output line 48a.

In this circuit, we provide nine condensers of equal value which we have designated 51a, 52a, 53a, 54a, 55a, 56a, 57a, 58a and 59a. The first four condensers are connected directly to corresponding points on the lower deck of the stepping switch 20a and directly to corresponding movable contact arms of relay 34a. The other five condensers are connected directly to corresponding movable contact arms of relay 34a which are, in turn, connected to selector switch 76 that indirectly connects them to the corresponding points of the lower deck of the stepping switch. Thus, one side of each of the first four condensers 51a, 52a, 53a, and 54a is connected to the input line 11a. The corresponding side of each of the last five condensers 55a, 56a, 57a, 58a and 59a is connected to a line 75 that leads to the lowermost movable contact arm 77 of the selector switch 76. The opposite side of each of the first four condensers is connected as follows: the first condenser 51a by line 56a to point 21a and to arm 36a of relay 34a; the second condenser 52a by line 57a to point 22a and to arm 37a of relay 34a; the third condenser by line 58a to point 23a and to arm 38a of relay 34a; and the fourth condenser by line 59a to point 24a and to arm 39a of relay 34a. The lines 56a, 57a, 58a and 59a are continued on to the respective contact points 79a, 80a, 81a, and 82a of the selector switch 76. The corresponding side of each of the last five condensers 55a, 56a, 57a, 58a and 59a is connected as follows: the fifth condenser 55a by line 60a to relay arm 40a; the sixth condenser 56a by line 85 to relay arm 41a; the seventh condenser 57a by line 86 to relay arm 42a; the eighth condenser 58a by line 87 to relay arm 43a and the ninth condenser 59a by line 88 to relay arm 44a. The lines 60a, 85, 86, 87 and 88 are continued on to the respective contact points 87b, 79b, 80b, 81b and 82b.

The selector switch 76 is arranged so that it can be set in one position where it arranges the circuit to average four out of five packages or in another position where it arranges the circuit to average nine out of ten packages, it being shown in this latter position in Figure 2. All of the seven movable contact arms 77, 78, 79, 80, 81, 82 and 83 of this switch are ganged together by connection 84 and cooperate with the respective pairs of contact points 77a—77b, 78a—78b, 79a—79b, 80a—80b, 81a—81b, 82a—82b, and 83a—83b. The point 77b is connected by line 90 to the end of line 11a which along with line 48a serve as the output lines of our device. The point 77a is free of any line. The point 78a is also free and so is point 83b while point 83a is connected by line 91 to line 35a. The switch arms 78, 79, 80, 81 and 82 of switch 76 are connected by the respective lines 92, 93, 94, 95 and 96 to the respective contact points 25a, 26a, 27a, 28a and 29a of the lower deck of switch 20a. The arm 83 of switch 76 is connected by line 97 to the contact point 25b of the upper deck of switch 20a.

As in Figure 1, a relay or mechanical means will be provided for moving the contact arms 19a and 27a of the stepping switch 20a. The relay 62a is shown in this example and will be energized through the lines 65a and 66a. Each time the relay 62a is energized, the arms 19a and 27a will be moved one step in a counterclockwise direction by means of the mechanical connection 28a.

This averager will function similar to the averager shown in Figure 1 with the exception that the next package, after each group of packages to be averaged, is relied upon to connect the condensers in parallel. For example, if the selector switch 76 is in the "up" or nine-package position, all of the nine condensers will be set up in the circuit for charging by successive packages, due to the fact that all the condensers will be connected to the common output line 11a since switch contact arm 77 will connect line 75 to line 90 that is connected to line 11a. However, the tenth package will not be averaged but will be relied upon to actuate nine-contact relay 34a, thereby placing all of the condensers in parallel. If the switch 76 is in the "down" or four-package position, the four condensers 51a, 52a, 53a, and 54a will be set up for charging but the other five condensers 55a, 56a, 57a, 58a and 59a will not, since the arm 77 will now be in position to disconnect lines 75 and 90 and thereby disconnect the latter five condensers from the output line.

With the selector switch in the nine-package position, as packages pass through the machine, the condensers 51a, 52a, 53a, 54a, 55a, 56a, 57a, 58a and 59a will be successively connected in the circuit by actuation of the stepping relay 62a which will produce step-by-step movement of the contact arm 19a, of the lower deck of the stepping switch 20a, into contact with the successive points 21a, 22a, 23a, 24a, 25a, 26a, 27a, 28a and 29a. Any of such packages will charge its corresponding condenser. Arm 27a will at the same time move into its successive positions but it will be noted that when it moves into its fifth position and contacts point 25b, nothing happens because the contact arm 83 of switch 76 will be in contact with the dead point 83b. However, as the tenth package passes through the checking machine, the upper arm 27a will contact the point 300b while the lower arm 19a will be in a blank position. This will result in completing a circuit from the source of D. C. current 30a to the relay coil 33a of relay 34a which will move all the nine relay contacts 36a, 37a, 38a, 39a, 40a, 41a, 42a, 43a and 44a into contact with the associated contacts 43a, 44a, 45a, 46a, 47a, 48a, 49a, 50a and 51a, respectively, thereby connecting all of the condensers to the output line 48a.

If four packages are to be averaged, the selector switch 76 is moved to the four package position. This involves moving the mechanical connection 84 downwardly to swing the contacts 77, 78, 79, 80, 81, 82 and 83 from the respective points 77b, 78b, 79b, 80b, 81b, 82b and 83b into engagement with the respective points 77a, 78a, 79a, 80a, 81a, 82a and 83a. After four packages have passed through the check-weighing machine and have successively connected the first four condensers 51a, 52a, 53a, and 54a in the circuit, the fifth package, regardless of its weight, will cause closing of the circuit to relay coil 33a which will cause movement of all the relay contact arms into engagement with their associated contact points, the arms 36a, 37a, 38a, and 39a being the only ones effective to connect any condensers in parallel, connecting the condensers 51a, 52a, 53a and 54a, through output lines 48a and 11a. The relay contacts 40a, 41a, 42a, 43a and 44a serve to connect condensers 55a, 56a, 57a, 58a and 59a to line 48a but the connection of the opposite side of these condensers to line 11a is broken since contact arm 77 of switch 76 is spaced from the point 77b. Therefore, the latter five condensers cannot be charged even though arm 19a of the lower deck of switch 20a moves into contact with the successive points 25a, 26a, 27a, 28a and 29a. As arm 19a successively contacts points 26a, 27a, 28a and 29a, with switch 76 in the four package position, condensers 51a, 52a, 53a and 54a are successively connected in the circuit. For example, with arm 19a in contact with point 29a, the circuit to condenser 51a includes line 93, switch arm 79 of switch 76, contact point 79a, and line 56a. With the selector switch 76 in the four-package position, the points 25b of the upper deck of switch 20a and 300b are connected together since arm 83 of switch 76 is in contact with point 83b. Also, both of these contact points are connected by line 35a to relay 34a. Therefore, whenever arm 27a, of the upper deck of the selector switch 20a, contacts either point 25b or point 300b, a circuit from the current source 30a to the relay coil 33a is completed so as to close the relay contacts and connect the first four condensers in parallel. Thus, the relay 34a is actuated at the fifth and tenth positions of the stepping switch.

In Figure 3, we have illustrated a cumulative averager which is similar to the averager of Figure 1 except that it is capable of averaging not only a group of five units, but is capable of obtaining the cumulative average of several groups of five units, for example, ten, twenty-five or fifty units. The first part of the circuit is substantially the same as the circuit of Figure 1 but additions have been made to obtain the cumulative average of two, five and ten of such groups, that is, ten, twenty-five and fifty units. However, it should be understood that the cumulative part of the circuit can be extended to obtain the cumulative average of any desired number of groups of five. Furthermore, the device is not limited to groups of five and the circuit may be varied to obtain the cumulative average of several groups of varying numbers of units.

The cumulative averager of Figure 3 includes the input lines 10c and 11c from the "Selectrol" or similar checking machine or device. The line 11c is connected to one side of each of the five condensers 51c, 52c, 53c, 54c and 55c which are of equal value. A stepping switch 20c of the two-deck type is provided and includes the lower deck with five angularly spaced contact points 21c, 22c, 23c, 24c and 25c which are uniformly spaced for cooperation with the contact arm 19c which will move in a counterclockwise direction. The upper deck of the stepping switch 20c is provided with the contact points 21d, 22d, 23d, and 24d which are in the same relative angular positions as points 21c, 22c, 23c and 24c of the lower deck. The movable contact arm 27d is also provided at the upper deck. The arm 27d is connected to arm 19c for step-by-step movement therewith in a counterclockwise direction by means of a mechanical connection indicated at 28c.

As indicated above, one side of each of the condensers 51c, 52c, 53c, 54c, and 55c is connected to the line 11c. The opposite side of each of these condensers is connected in the circuit as follows: condenser 51c by line 56c to contact point 21c of the lower deck of switch 20c; condenser 52c by line 57c to contact point 22c; condenser 53c by line 58c to contact point 23c; condenser 54c by line 59c to contact point 24c; and condenser 55c by line 60c to contact point 25c. Each condenser is also connected to a movable contact arm of relay 34c as follows: condenser 51c by lines 56c and 56d to contact arm 36c; condenser 52c by lines 57c and 57d to contact arm 37c; condenser 53c by lines 58c and 58d to arm 38c; condenser 54c by lines 59c and 59d to arm 39c; and condenser 55c by lines 60c and 60d to arm 40c. The arms 36c, 37c, 38c, 39c and 40c are ganged together by means of a mechanical connection 41c actuated by coil 33c of relay 34c. The fixed contacts 43c, 44c, 45c, 46c and 47c, which cooperate with the respective arms 36c, 37c, 38c, 39c and 40c, are all connected to a line 48c. The line 11c is provided with a switch 11d to which the mechanical connection 41c of the relay 34c is connected. All the relay contact arms and the arm of switch 11d are normally in open positions. The arms 19c and 27d are moved step-by-step together by means of the connection 28c which is actuated by the relay coil 62c that is normally deenergized. The relay coil 62c also actuates movable contact arms 101 and 102 by means of mechanical connection 103. The arm 101 is normally spaced from the contact point 104 and the arm 102 normally contacts point 105. The contact point 104 is connected by line 31c to the source of D. C. current 30c which, in turn, is connected to line 16c. Line 16c is connected by line 29c to the movable contact arm 27d of the upper deck of switch 20c. The contact point 105 is connected to line 10c. The relay coil 33c is connected by the line 35c to the contact point 21d and is connected by line 31d to the contact arm 101. The contact arm 102 is connected by line 18c to the movable contact arm 19c of the lower deck of switch 20c.

We provide the relay 13c in the circuit which, like relay 13 of Figure 1, may receive a stepping impulse each time an article passes through the checking machine. For example, this relay may be controlled by the photoelectric beam of the "Selectrol" and the coil 15c thereof is normally energized. The line 16c is connected to the photoelectric relay circuit of the "Selectrol" and to the line 29c. A line 66c branches from line 16c and is connected to relay coil 62c. A line 17c is also connected to the said photoelectric circuit and to the relay coil 15c. The opposite side of the coil is connected by line 17d to the resistance 18c which is connected to D. C. supply line 31c. The relay coil 15c actuates movable contact arms 14c and 14d together through the medium of a mechanical connection 15d. Arm 14c is associated with contact points 12c and 12d and arm 14d is associated with contact points 12e and 12f. Since coil 15c is normally energized, arms 14c and 14d normally engage the respective points 12d and 12f. The point 12c is connected to line 17c by line 17e; the point 12d is connected to line 17d by line 17f; the point 12e is connected to a line 106 which is also connected to D. C. supply line 31c; and the point 12f is dead. The arm 14c is connected to one side of a condenser 32c, the other side being connected to line 17d while the arm 14d is connected to line 65c which is connected by line 65d to one side of the relay coil 62c.

The portion of the circuit so far described is substantially similar in arrangement and function to the circuit of Figure 1. It serves to average the first five articles or packages passing through the checking machine. The remainder of the circuit now to be described is for obtaining the cumulative average of desired numbers of groups of five articles or packages which successively pass through the checking machine.

It will be noted that we have provided a stepping switch 100 which is of the four-deck type. The lower deck of this switch is provided with the ten contact points 121, 122, 123, 124, 125, 126, 127, 128, 129 and 130; the next deck is provided with the eight contact points 122a, 123a, 124a, 125a, 126a, 127a, 128a, and 129a which correspond respectively with the points of the lower deck of similar numbers; the next deck is provided with the four contact points 121b, 122b, 123b and 126b; and the uppermost deck is provided with the nine contact points 122c, 123c, 124c, 125c, 126c, 127c, 128c, 129c and 130c. The lower deck of the switch is provided with the movable contact arm 131, the next deck with the arm 131a, the next deck with the arm 131b, and the uppermost deck with the arm 131c. All of these arms are connected together for step-by-step movement in a counterclockwise direction by means of a mechanical connection indicated by numeral 132. This connection is actuated by means of the relay coil 133. This relay coil also serves to actuate switch arm 134, to which it is connected by mechanical connection 135, to move it relative to contact point 136. Arm 134 is normally in contact with point 136 because relay coil 133 is normally deenergized.

This portion of the circuit also includes the ten condensers 141, 142, 143, 144, 145, 146, 147, 148, 149 and 150 which are of equal value. One side of each of these condensers is connected to a continuation of the line 11c which serves also as the output line of this averager. The opposite side of each of these condensers is connected to the respective contact points of the lower deck of switch 100 as follows: condenser 141 by line 151 to contact point 121 of the lower deck; condenser 142 by line 152 to contact point 122; condenser 143 by line 153 to point 123; condenser 144 by line 154 to point 124; condenser 145 by line 155 to point 125; condenser 146 by line 156 to point 126; condenser 147 by line 157 to point 127; condenser 148 by line 158 to point 128; condenser 149 by line 159 to point 129; and condenser 150 by line 160 to point 130.

The condensers are also connected to a selector switch 200. This switch is used for setting the averager so that it will selectively average five, ten, twenty-five or fifty packages or articles. It includes the ten movable contacts 161, 162, 163, 164, 165, 166, 167, 168, 169 and 170. These contacts are connected together by a suitable mechanical connection 201 so that they can all be moved simultaneously and each cooperates with a set of fixed contacts. The contact 161 is adapted to be moved into association with any of the four fixed contacts 171, 172, 173 and 174; the contact 162 cooperates with three fixed contacts 171a, 172a, and 173a; the contact 163 cooperates with two fixed contacts 171b and 172b; the contact 164 cooperates with two fixed contacts 171c and 172c; the contact 165 cooperates with two fixed contacts 171d and 172d; the contact 166 cooperates with fixed contact 171e; the contact 167 with fixed contact 171f; the contact 168 with fixed contact 171g; the contact 169 with fixed contact 171h; and the contact 170 with fixed contact 171i. When connection 201 is used to move the ten contacts 161, 162, 163, 164, 165, 166, 167, 168, 169 and 170 into engagement with the respective contacts 171, 171a, 171b, 171c, 171d, 171e, 171f, 171g, 171h, and 171i, the switch 200 is set so that the device will average fifty packages. When the switch is set so that the five contacts 161, 162, 163, 164 and 165 are in engagement with the respective contacts 172, 172a, 172b, 172c and 172d, the device will average twenty-five packages. When the switch is set so that the two contacts 161 and 162 are in engagement with the respective contacts 173 and 173a, the device will average ten packages. With contact 161 in engagement with contact 174, the device will average five packages.

Each of the sets of fixed contacts of switch 200 with the exception of the uppermost set is connected to a corresponding movable contact arm of a relay 300, which includes the ten arms 301, 302, 303, 304, 305, 306, 307, 308, 309 and 310, as follows: contacts 171a, 172a and 173a to arm 302 by line 302a; contacts 171b and 172b by line 303a to arm 303; contacts 171c and 172c by line 304a to arm 304; contacts 171d and 172d by line 305a to arm 305; contact 171e by line 306a to arm 306; contact 171f by line 307a to arm 307; contact 171g by line 308a to arm 308; contact 171h by line 309a to arm 309; and contact 171i by line 310a to arm 310. The relay arms 301–310, cooperate with the respective fixed contacts 301b, 302b, 303b, 304b, 305b, 306b, 307b, 308b, 309b and 310b, all of which are connected to a common output line 400c. The uppermost set of the fixed contacts of switch 200 is connected to the contact points of the second uppermost deck of stepping switch 100 as follows: contact 171 by line 121d to contact point 121b; contact 172 by line 126d to contact point 126b; contact 173 by line 123d to contact point 123b; and contact 174 by line 122d to contact point 122b. All of the condensers 141–150 with the exception of 141 are connected to corresponding movable contacts of switch 200. It will be noted that condenser 141 is connected by lines 151 and 151a to the movable contact arm 301 of relay 300. The remaining condensers are connected to the movable contacts of switch 200 as follows: condenser 142 by lines 152 and 152a to movable contact 162; condenser 143 by lines 153 and 153a to contact 163; condenser 144 by lines 154 and 154a to contact 164; condenser 145 by lines 155 and 155a to contact 165; condenser 146 by lines 156 and 156a to contact 166; condenser 147 by lines 157 and 157a to contact 167; condenser 148 by lines 158 and 158a to contact 168; condenser 149 by lines 159 and 159a to contact 169; and condenser 150 by lines 160 and 160a to contact 170. The movable contact 161 is connected to line 161a which extends between the coil 300a of relay 300 and the coil 201a of a relay 201. The relay coil 300a is connected by line 23e to the contact point 23d of the upper deck of stepping switch 20c. The relay coil 300a is connected to all the relay contact arms 301–310 for simultaneous actuation thereof by means of mechanical connection 300b.

The relay coil 201a is connected by line 24e to the contact point 24d of the upper deck of stepping switch 20c. The relay 201 includes the movable contact arms 181, 182, 183, 184, and 185 actuated by the coil 201a through the mechanical connection 201b and which are associated with the respective stationary contacts 181a, 182a, 183a, 184a, and 185a. An additional contact 181b is associated with arm 181. The relay arms are connected in the circuit as follows: arm 181 by line 133a to the relay coil 133 of stepping switch 100; arm 182 to line 29c of the D. C. supply; arm 183 by line 11e to line 11f that connects to output line 11c; arm 184 by line 11g to line 11e; and arm 185 by line 128d to contact point 128c of the uppermost deck of stepping switch 100. The fixed contacts of relay 201 are connected in the circuit as follows: point 181b to line 65c; point 181a by line 131d to arm 131c of the uppermost deck of stepping switch 100; point 182a by line 136a to point 136 associated with relay arm 134; point 183a to an extension of line 151a which leads from condenser 141; point 184a to an extension of line 152a which leads from condenser 142; and point 185a by line 161b to line 161a, which runs between relay coils 201a and 300a and in which is connected the movable contact 161 of selector switch 200.

It will be noted that relay coil 133 is also connected to the contact 22d of the upper deck of stepping switch 20c by means of line 22e.

It will be noted further that all the points 122c, 123c, 124c, 125c, 126c, 127c, 128c, and 129c of the uppermost deck of stepping switch 100 are connected together by wire 100c. The line 106 leading from relay 13c is also connected to wire 100c. A line 106a connects wire 106 to contact arm 131b of the second uppermost deck of stepping switch 100. The condenser 143 is also connected by line 153b, extending from line 153a, to contact point 122a of the second lowermost deck of switch 100 and the condenser 144 is connected by extension 154b to point 123a. The point 124a of the second deck is connected to point 125 of the lower deck by line 125e and, therefore, to condenser 145 and the point 125a is connected to point 126 by line 126e and, therefore, to condenser 146. The condenser 147 is connected to point 126a by line 157b which extends from line 157; the condenser 148 is connected to point 127a by line 158b extending from line 158; the condenser 149 is connected to point 128a by means of extension 159b; and the condenser 150 is connected to point 129a by means of extension 160b.

The operation of this cumulative averager will now be described.

As indicated above, the averager may be set for averaging five, ten, twenty-five or fifty packages or articles by the proper selective setting of switch 200. In Figure 3, we have shown the averager set for averaging ten packages.

The output voltage from the checking machine or device will be conducted into this averager through the lines 10c and 11c. The lines 16c and 17c will serve to supply the stepping impulse to the averager from the photoelectric circuit of the checking machine, this circuit being normally energized so that relay 13c is normally energized. When a package interrupts the light beam in the photoelectric cell circuit, the electrical circuit is also interrupted for an instant, deenergizing relay 13c. Subsequent energization energization of this relay, after the package has passed through the photoelectric cell beam, is delayed by provision of the condenser 32c. Relay coils 62c and 133 are the actuating means for the respective stepping switches 20c and 100. Each of these stepping switches is of the type wherein energization of the asociated relay coil merely triggers a spring arrangement and the movable contact arm thereof does not move on to the next position on the stepping switch until current stops flowing in such coil. This type of switch is well known to persons skilled in the art and is a common use. A suitable switch for our purpose is manufactured and sold by C. P. Clare & Company, Chicago 30, Illinois.

Generally speaking, relay 34c is used to parallel the first bank of condensers 51c–55c to obtain the average of the first group of five packages passing through the checking machine and relay 300 is used to parallel the second bank of condensers 141–150 to obtain an output average of one or several of such groups of five packages, depending upon the setting of switch 200, it being set, in this instance, for two groups or ten packages as shown in Figure 3. Relay 201 is actuated only when it is necessary to move the contact arms in stepping switch 100 back to starting positions.

Obviously, averaging of the first five packages passing through the checking machine, will be accomplished by successively connecting the condensers 51c–55c in the circuit through actuation of stepping switch 20c and then connecting all of them in parallel through actuation of relay 34c so that the average output from the first five packages will create a current through lines 48c and 11c. This part of the averager functions substantially the same as the device shown in Figure 1. As shown in Figure 3, the contact arms 19c and 27d of stepping switch 20c are in engagement with the respective points 22c and 22d. It will be noted that switch 11d will also be actuated by relay coil 33c, this switch being normally open. This switch will only be closed when arm 27d of the upper deck of stepping switch 20c is in engagement with point 21d to energize relay coil 33c which happens only upon the passage of the last article of each succeeding group of five through the photoelectric beam. This prevents any of the condensers 141–150 from being affected until the last article of each succeeding group passes through the checking machine.

Let us assume that the stepping switch 100 has already been actuated to charge the condenser 141 with a charge representative of the average value of five previous packages. At this time, the arms 19c and 27d of stepping switch 20c are in the positions to which they were moved by the fifth package, that is, in engagement with the respective points 22c and 22d, as shown. Also, at this time, arms 131, 131a, 131b, and 131c of stepping switch 100 will be in the next preceding positions to those shown.

As the sixth package is passing through the checking machine, relay 13c will have its contact arms 14c and 14d in their lower positions in engagement with the respective points 12d and 12f and, consequently, there will be a complete circuit through condenser 52c to the input lines 10c and 11c leading from the checking machine. This circuit will be from line 11c, through condenser 52c, through arm 19c, line 18c, arm 102, which will now be engaged with point 105 because of deenergization of coil 62c, and line 10c. Therefore, a charge will be placed on condenser 52c. After the sixth package moves sufficiently through the checking machine to interrupt the photoelectric beam, it will deenergize relay 13c and contact arms 14c and 14d will be moved to their uppermost positions in contact with the respective points 12c and 12e. This will energize relay coil 62c and cause the associated arms 101 and 102 to move downwardly, the arm 102 moving away from point 105 to break the connection between lines 10c and 18c and, therefore, break the circuit to condenser 52c, arm 101 moving into engagement with point 104 but the circuit to relay coil 33c not being completed because arm 27d is not in contact with point 21d.

With contact arm 14d engaging point 12e and contact arm 27d of the upper deck of stepping switch 20c engaging point 22d, it will be apparent that relay coil 133 will be energized so that arm 134, associated therewith, will move away from point 136. The circuit for coil 133 is from D. C. source 30c through lines 16c and 29c, arm 27d, line 22e, coil 133, line 133a, relay arm 131 and contact point 181b of relay 201, line 65c, relay arm 14d of relay 13c, line 106 and line 31c back to source 30c. After the condenser 32c permits relay 13c to become energized again, the sixth package having previously interrupted the photoelectric circuit, the arms 14c and 14d will be moved downwardly and condenser 32c will be shorted-out of the circuit. With arm 14d in its lower position, relay coil 62c will again be deenergized so that arm 101 will move away from point 104 and arm 102 will engage point 105; also, the circuit to relay coil 133 will be broken at arm 14d which will cause relay arm 134 to engage point 136 again; and the circuit to relay coil 33c will also be broken. Deenergizing coil 133 results in movement of arms 131, 131a, 131b, and 131c of stepping switch 100, one step, since the spring mechanism associated therewith has been triggered previously, into the positions shown in Figure 3, that is, in engagement with the respective points 122, 122a, 122b and 122c. At this time, the circuit from arm 131 is broken at relay 34c; the circuit from arm 131a is broken at relay 201; the circuit from arm 131b is broken at relay 13c; and the circuit from arm 131c is also broken at relay 201. Therefore, condensers 142–150 cannot be affected, it being understood that the condenser 141 has been charged previously. At this time, the switch 11d is open and prevents paralleling of the first bank of condensers with the second bank of condensers.

Thereafter, the seventh, eighth, ninth and tenth packages passing through the checking machine will connect the condensers 53c, 54c, 55c, and 51c, successively into the circuit and charge them depending upon the weights of the corresponding articles. After the tenth package has connected condenser 51c in the circuit and has interrupted the photoelectric circuit, relay 13c has been deenergized, resulting in energizing relay coil 62c to move contact 102 away from point 105 and arm 101 into contact with point 104. At this time, contact arm 27d of stepping switch 20c will be in engagement with point 21d and, therefore, since arm 101 is engaged with point 104, the circuit to relay coil 33c from D. C. source 30c is completed and, consequently, the arms 36c–40c of relay 34c will be moved into closed positions and switch 11d will be closed. This will place condensers 51c–55c in parallel and cause condenser 142 to be charged with a charge corresponding to the average of the group of five packages passing through the checking machine and consisting of the sixth to tenth packages. Condenser 142 is charged because actuation of relay 34c completes the circuit therethrough from the output lines 48c and 11c leading from condensers 51c–55c as follows: through line 48c, arm 131 of the lower deck of stepping switch 100, line 152, condenser 142, and line 11c. After a slight delay, relay 13c will again become energized which will result in deenergizing coil 62c so that arms 19c and 27d will move to their next positions which are the positions shown; coil 33c will be deenergized allowing all the contact arms of relay 34c and switch 11d to open.

Package eleven will now move through the checking machine and its weight will produce a charge on condenser 52c; the package then interrupting the light beam of the photoelectric cell, thereby deenergizing relay 13c. This results in energizing relay coil 62c and since arm 27d is in contact with point 22d, the circuit to relay coil 133 is completed and arm 134 will be moved away from contact point 136. Consequently, when relay 13c again becomes energized and relay coils 62c and 133 are deenergized, movable contact arms 19c and 27d will move into contact with the respective points 23c, 23d, and movable arms 131, 131a, 131b and 131c will move to the next position in contact with the respective points 123, 123a, 123b, and 123c. Thereafter package twelve will impress a voltage upon condenser 53c and will interrupt the photoelectric beam to deenergize relay 13c and energize coil 62c. With movable contact arms 131b and 131c in contact with points 123b and 123c, with contact arm 27d in contact with point 23d, and with arm 101 in contact with point 104, relay 300 is energized since the selector switch 200 is set on the ten-package position. The circuit for relay coil 300a at this time is from the coil in one direction through line 23e, point 23d, arm 27d, line 29c, line 16c, power source 30c, line 31c, line 106, line 106a, arm 131b, point 123b, line 123d, contact 161 of switch 200, and through line 161a to the other side of coil 300a. Therefore, an output of condensers 141 and 142 will be obtained through output lines 80c and 11c since relay contact arms 301 and 302 close. This output will represent the cumulative effect of the charges in condensers 141 and 142 which is the average value of the ten packages that have passed through the checking machine. When the relay 13c again becomes energized after the slight delay produced by condenser 32c, the stepping switch 20c will move another step so that arms 19c and 27d will contact with points 24c and 24d, respectively.

With arm 27d in contact with point 24d and with arms 131b and 131c in contact with points 123b and 123c, relay 201 will be actuated, thereby closing its movable contacts in a downward direction. The circuit to relay coil 201a may be traced as follows: from the negative side of current source 30c through lines 16c and 29c, arm 27d, point 24d, line 24e, relay coil 201a, line 161a, movable contact 161, line 123d, to point 123b, arm 131b, line 106a, line 106, to line 31c at the positive side of the source 22. Closing of contact arm 185 provides an additional line, by means of lines 161b, 128d, wire 100c, line 106 and line 31c, to the positive side of source 30c. Therefore, even if the other circuit, through movable contact 161 and point 173, to contact arm 131b, is interrupted by movement of contact arm 131b from point 123b, the relay coil 201a will remain energized and movable contact arms 181–184 will remain closed. These contacts will remain closed until the circuit to the relay coil 201a is interrupted by movement of movable contact arm 27d of the upper deck of switch 20c away from the point 24d.

Tracing the circuit from movable contact arm 131c, which is connected to the positive side of source 30c through wire 100c, line 106 and line 31c, it will be seen that movable contact 161 will be in its down position in contact with point 181a, thereby energizing relay coil 133 through arm 134, point 136, line 136a, point 182a, relay arm 182, and lines 29c and 16c to the negative side of source 30c. However, just as soon as relay coil 133 is energized, contact arm 134 is moved downwardly away from point 136, thereby interrupting the circuit to such coil. This interruption will cause contact arms 131, 131a, 131b, and 131c to move to the next position where arms 131 and 131a will contact the respective points 125, 125a; arm 131b will not contact with a point; and arm 131c will contact point 125c. In this position of the contact arms, since movable relay arm 185 has remained closed, the circuit to relay coil 201a will continue to be closed and since arm 131c is still in circuit with the positive side of source 30c, the coil 133 will again be energized, moving arm 134 away from point 136, deenergizing the coil and moving arms 131, 131a, 131b and 131c to their next position where they will contact the respective points 126, 126a, 126b, and 126c. This procedure will be repeated until the movable arms of stepping switch 100 return to their first position. At this time, the arm 131c of the top deck of the switch 100 will not contact a point. Consequently, the opening and closing of movable arm 134 will stop, due to the breaking of the circuit to coil 133 at this point, and contact arms 131, 131a, 131b, and 131c will remain in this first position. All this will happen before the arms of stepping switch 20c can move on to their next position. The above-described successive movement of the movable arms of stepping switch 100 occurs in less than one-half second. Therefore, relay 201 will remain activated until relay 13c is again energized, due to the movement of package thirteen through the "Selectrol," thereby deenergizing coil 62 which, in turn, moves contact 27d to its next position where it does not contact a point and, therefore, the D. C. supply circuit for coil 201a is broken at this point. Thus, deenergizing coil 201a will produce movement of relay contact arms 181–185 in an upward direction.

When the thirteenth packages moves through the photo-electric beam, a charge will be placed on condenser 54c and the fourteenth package will cause a charge to be placed on condenser 55c. The fifteenth package will cause a charge to be placed on condenser 51c. At this time, since arm 19c is in contact with the point 21c and since the arms 131, 131a, 131b and 131c are in their first position, the charges on condensers 51c–55c will be dumped into condenser 141 as package fifteen interrupts the photocell circuit, and the entire procedure will then be repeated.

Provision is made, as shown, by movable contact arm 131a of selector switch 100 to short-out the condenser which is next to receive a charge. This is necessary because the charging source for condensers 141–150 is not a substantially constant voltage source as is the source for the condensers 51c–55c. In the case of condensers 141 and 142, however, provision is made by the closing of relay contact arms 183 and 184, upon energization of relay coil 201a, to short-out the condensers 141 and 142 prior to their having a charge placed thereon. The remaining condensers 143–150 are shorted-out through the medium of movable contact arm 131.

It should be apparent that if five packages were being averaged instead of ten, the selector switch 200 would be adjusted so that movable contact 161 would engage point 174 and the other contacts 162–170 would not engage any points. As soon as the cumulative average of five packages is dumped into condenser 141, it would, after the seventh package's movement through the checking machine, be available at the output lines 480c and 11c, by means of relay 300 closing. Movable contact arms 131, 131a, 131b and 131c of stepping switch 100 would then be advanced through all the other nine contact positions and then back to their first position.

If the selector switch 200 was set to average twenty-five packages, that is, with movable contacts 161, 162, 163, 164 and 165 in contact with fixed contacts 172, 172a, 172b, 172c, and 172d, condensers 141, 142, 143, 144 and 145 would be charged, each with a charge corresponding to the cumulative charge of different groups of five packages that had been previously collected on condensers 51c–55c. Then, after the value corresponding to the average of twenty-five packages had been obtained, movable contact arms 131, 131a, 131b and 131c of stepping switch 100 would be advanced from the sixth position where they contact the respective points 126, 126a, 126b, and 126c to the first position. When fifty packages are being averaged, the advance is merely from the tenth position to the first position.

It will be apparent from the above that we have provided a system which determines the average value of a particular variable characteristic in a group or series of objects or articles being checked in regard to such characteristic. Such value from our device may be used merely as an indication or may be supplied as a control factor to a suitable control unit. For example, the control factor may be supplied to a control unit of the type disclosed in the Merrill and Hecox application, previously mentioned, or the control factor may be used directly in controlling a correction motor for the filler spout F.

Having thus described our invention, what we claim is:

1. In combination with means for checking a series of successive articles in regard to a measurable physical characteristic thereof which may vary from a selected norm; means for obtaining the average of the variation of said physical characteristic from said norm for each of successive groups of said articles, means for obtaining the cumulative average of the variation of said physical characteristic from said norm for a series of such groups of articles, and means for converting such cumulative average value into a control factor.

2. In combination with means for checking a series of successive articles in regard to a measurable physical characteristic which may vary from a selected norm and means for imparting such physical characteristic to the successive articles; means for obtaining the average of the variation of said physical characteristic from said norm for each of successive groups of said articles; means for obtaining the cumulative average value of the variation of said physical characteristics from said norm for a series of such groups of articles, means for converting such cumulative average value into energy, and means for using such energy to control said means to obtain the desired norm in the physical characteristic in succeeding articles acted on by said means.

3. In combination with means for filling a series of successive packages and means for checking the filled packages successively to determine whether they are underweight or overweight relative to a standard; means for obtaining the average of the variation in weight from the standard for each of successive groups of said packages, means for obtaining the cumulative average value of the variation in weight from the standard for a series of such groups of packages, means for converting such cumulative average value into energy, and means for using such energy to control said filling means to obtain the desired standard of weight in subsequently checked packages.

4. In combination with a device for checking a series of successive articles in regard to a measurable physical characteristic thereof which may vary and including electronic means for creating an output voltage from said device, an averaging circuit, means actuated by each of the successive articles being checked for connecting said electronic means to said averaging circuit to supply an input voltage into said circuit, said averaging circuit including a plurality of voltage-receiving capacitors of equal value, means in said circuit for successively connecting said capacitors in said circuit and actuated by successive articles being checked, and means actuated by one of the series of articles being checked for connecting all of the capacitors in parallel to provide an output voltage from said circuit.

5. The combination of claim 4 wherein said means for connecting said capacitors successively in said circuit comprises a stepping switch moved step-by-step by successive articles, and wherein said means for connecting said capacitors in parallel comprises a relay switch connected to said stepping switch and actuated thereby.

6. The combination of claim 5 wherein said means for connecting the electronic circuit to the averaging circuit is a relay-actuated impulse switch.

7. The combination of claim 5 wherein the stepping switch is actuated by a relay.

8. The combination of claim 4 including means connected in said circuit for selecting the number of capacitors which can be successively connected in the circuit.

9. In combination with a device for checking a series of successive articles in regard to a measurable physical characteristic thereof which may vary and including electronic means for creating an output voltage if such characteristic thereof does vary; an averaging circuit for receiving the output voltage from said device, means actuated by each of the successive articles being checked for connecting said electronic means to said averaging circuit to supply an input voltage into said circuit, said averaging circuit including a group of voltage-receiving capacitors of equal value, said means for connecting the electronic means to the averaging circuit including a stepping switch connected in the circuit and moved step-by-step by the successive articles, said stepping switch being so connected to said capacitors as to successively connect said capacitors in the circuit, a selector switch connected in the circuit for selecting certain of said capacitors for connection in the circuit by said stepping switch, and a relay switch for connecting all of the selected capacitors in parallel to provide an output voltage from said circuit.

10. The combination of claim 9 wherein the stepping switch is actuated by a relay, and means in cooperative relationship with said checking device and actuated by each successive article to supply an actuating impulse to said relay.

11. The combination of claim 10 wherein the last-named means comprises a photocell circuit which is so arranged relative to said checking device that the photocell is blanked by each article after it is checked thereon.

12. In combination with a device for checking a series of successive articles in regard to a measurable physical characteristic thereof which may vary and including electronic means for creating an output voltage if such characteristic thereof does vary; an averaging circuit for receiving the output voltage from said device, means actuated by each of the successive articles being checked for connecting said electronic means to said averaging circuit to supply an input voltage into said circuit, said averaging circuit including a plurality of voltage-receiving capacitors, said capacitors being divided into a first group consisting of a plurality of capacitors of equal value, a first stepping switch connected in the circuit and moved step-by-step by actuation of said means for connecting the electronic means to the averaging circuit, said first stepping switch being connected to said first group of capacitors so as to successively connect said capacitors in said circuit, a first relay switch connected to said first group of capacitors and actuated by said first stepping switch to connect all of such capacitors in parallel and to a common output line, a second stepping switch connected in the circuit to said first selector switch and said second group of capacitors for successively connecting said capacitors in the circuit, said second group of capacitors being connected to said output line, and a second relay switch connected to said second group of capacitors and actuated by said second stepping switch to connect all of such capacitors in parallel and to a common output line.

13. The combination of claim 12 including a selector switch connected in the circuit between the second group of capacitors and the second relay switch for selecting certain capacitors of the second group for connection in the circuit.

14. The combination of claim 13 including a third relay switch connected to said first and second stepping switches for moving them back to their starting positions.

15. The combination of claim 14 wherein said means for connecting the electronic circuit to the averaging circuit is a relay-actuated impulse switch.

16. The combination of claim 15 wherein the relay-actuated impulse switch is provided with means for delaying action thereof.

17. In combination with a device for checking a series of successive articles in regard to a measurable physical characteristic thereof which may vary and including electronic means for creating an output voltage if such characteristic thereof does vary; an averaging circuit connected to said device for receiving the output voltage therefrom as an input voltage, said averaging circuit including a plurality of voltage receiving capacitors of equal value means connected in the circuit and actuated by successive individual articles passing through said device for successively connecting said capacitors in the circuit, means actuated by one of the series of articles passing through said device for connecting all of said capacitors in parallel to obtain an output voltage from the combined capacitors, said capacitors being arranged in one group, said averaging circuit including a second group of capacitors, said means for connecting all of the capacitors of the first group in parallel connecting them also to one of the capacitors of the second group.

18. The combination of claim 17 including means for connecting all of the capacitors of the second group in parallel, said means being actuated by one of the series of articles passing through said checking device.

19. In combination with a device for checking a series of successive articles in regard to a measurable physical characteristic thereof which may vary and including electronic means for creating an output voltage from said device, means for connecting said electronic means to said averaging circuit to supply an input voltage into said circuit and including a relay-actuated impulse switch, said averaging circuit including a plurality of voltage-receiving capacitors of equal value, a stepping switch in said circuit for successively connecting said capacitors in said circuit, a relay for moving said stepping switch step-by-step, and a relay switch connected to said stepping switch and actuated thereby for connecting all of said capacitors in parallel to provide an output voltage from said circuit, and means actuated by successive articles which are checked by said device for actuating said relay-actuated impulse switch and said relay-actuated stepping switch.

20. The combination of claim 19 wherein the relay-actuated impulse switch is provided with means for delaying actuation thereof.

21. The combination of claim 20 wherein said means for actuating said impulse switch and said stepping switch comprises a photoelectric circuit disposed in cooperative relationship to said checking device so that each article after being checked will blank the photocell thereof.

22. In combination with means for checking a series of successive articles in regard to a measurable physical characteristic imparted thereto by associated means and which may vary from a selected norm; means for obtaining actual values proportionate to such variable characteristics from successive articles, means for obtaining the average of such actual values for each of successive groups of said articles, and means for converting such average value into a control factor which is useful in controlling said associated means to obtain succeeding articles having the selected norm.

23. The combination of claim 22 including a unit for receiving said control factor and being operatively connected to said associated means which imparts the said physical characteristic to said articles to control such associated means.

24. The combination of claim 22 including means for selecting the number of articles to be checked in each group.

25. In combination with a device for checking a series of successive articles in regard to a measurable physical characteristic thereof which may vary and including electronic means for creating an output voltage if such characteristic thereof does vary; an averaging circuit connected to said device for receiving the output voltage therefrom as an input voltage, said averaging circuit including a plurality of voltage-receiving units which are successively connected in the circuit by the articles being checked, said voltage-receiving units being capacitors of equal value, and means for connecting all of said units together to obtain a control effect from the combined units, said means connecting all of said capacitors in parallel to obtain an output voltage from the combined capacitors.

26. The combination of claim 25 wherein said capacitors are successively connected in the circuit by successive individual articles passing through said device, and wherein said means for connecting all of the capacitors in parallel is actuated by one of the series of articles passing through said device.

27. In combination with means for checking a series of successive articles in regard to a measurable physical characteristic thereof which may vary from a selected norm; means for obtaining the average of the variation of said physical characteristic from said norm for each of successive groups of said articles, means for selecting the number of articles to be checked in each group, means for obtaining the cumulative average of the variation of said physical characteristic from said norm for a series of such groups of articles, means for selecting the number of groups for which a cumulative average is to be obtained, and means for converting such cumulative average value into a control factor.

28. In combination with a device for checking a series of successive articles in regard to a measurable physical characteristic thereof which may vary and including electronic means for creating an output voltage if such characteristic thereof does vary; an averaging circuit connected to said device for receiving the output voltage therefrom as an input voltage, said averaging circuit including a plurality of voltage-receiving units which are adapted to be successively connected in the circuit by the articles being checked, means connected in the circuit for selecting the number of voltage-receiving units which can be successively connected in the circuit, and means for connecting all of said units together to obtain a control effect from the combined units.

References Cited in the file of this patent

UNITED STATES PATENTS

| Number | Name | Date |
|---|---|---|
| 1,089,680 | Sloan | Mar. 10, 1914 |
| 1,921,317 | Molins | Aug. 8, 1933 |
| 2,258,859 | Mitelman | Oct. 14, 1941 |
| 2,349,437 | Keeler | May 23, 1944 |
| 2,477,395 | Sunstein | July 26, 1944 |
| 2,491,335 | Rick | Dec. 13, 1949 |
| 2,503,295 | Palmer | Apr. 11, 1950 |
| 2,514,054 | Hollden | July 4, 1950 |
| 2,532,010 | Courvoisier | Nov. 28, 1950 |
| 2,537,498 | Wickesser | Jan. 9, 1951 |

FOREIGN PATENTS

| Number | Country | Date |
|---|---|---|
| 587,210 | Great Britain | 1947 |
| 601,393 | Great Britain | May 5, 1948 |